Aug. 30, 1966  D. E. BRIDGES  3,270,343
RECEIVER FOR RECEIVING MULTIPLE FREQUENCIES TRANSMITTED
SIMULTANEOUSLY BY A PHASE COMPARISON
NAVIGATIONAL SYSTEM
Filed July 15, 1963
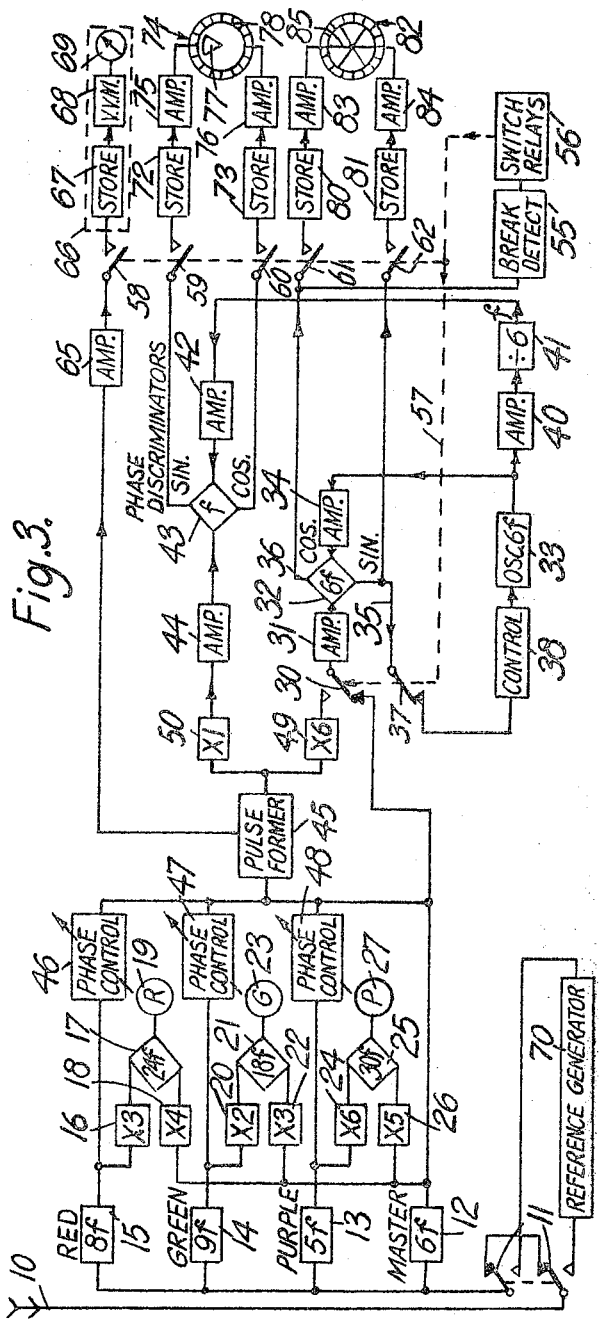
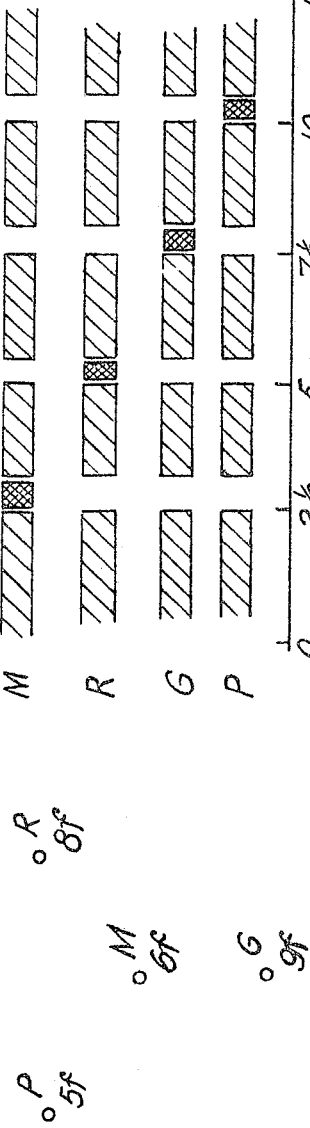
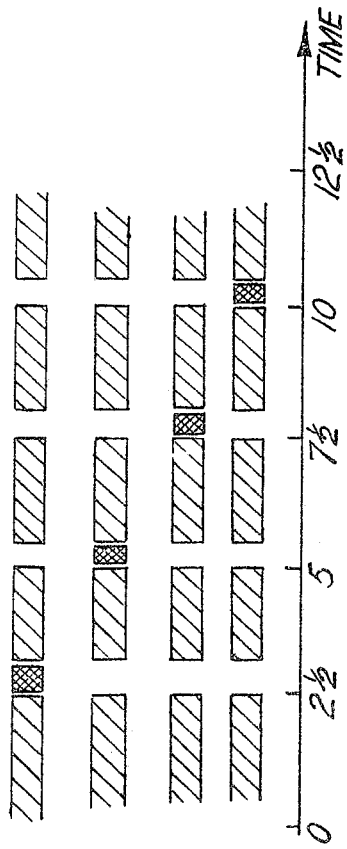
INVENTOR
DONALD EDWARD BRIDGES
BY Mawhinney & Mawhinney
ATTYS.

United States Patent Office 3,270,343
Patented August 30, 1966

3,270,343
RECEIVER FOR RECEIVING MULTIPLE FREQUENCIES TRANSMITTED SIMULTANEOUSLY BY A PHASE COMPARISON NAVIGATIONAL SYSTEM
Donald Edward Bridges, London, England, assignor to Decca Limited, London, England, a British company
Filed July 15, 1963, Ser. No. 295,166
Claims priority, application Great Britain, July 17, 1962, 27,429/62
12 Claims. (Cl. 343—105)

The invention relates to phase comparison radio navigation systems in which radio frequency signals of different but harmonically related frequencies are radiated from spaced points in fixed phase relationship and in which, at a mobile receiver, the radiated signals are received and a phase comparison is made between comparison signals derived from the received signals.

The invention will be more clearly understood by firstly considering certain existing types of phase comparison radio navigation systems. In a radio navigation system it is generally necessary to make the fullest use of every signal transmitted and to employ the minimum number of frequencies. In a typical transmitting chain for a Decca Navigator system, which is a hyperbolic phase comparison system, there might be a master station normally radiating signals of a frequency $6f$ where $f$ is the fundamental frequency of the system and is typically of the order of 14 kc./s. Spaced from the master station are three slave stations, known as the red, green and purple slave stations, which normally radiate signals of frequencies $8f$, $9f$ and $5f$ respectively. These normal transmissions, during which all the stations are transmitting simultaneously, each on a single frequency, provide, by the use of suitable phase comparison means in a mobile receiver, positional information defining the position of the receiver by determining the particular position lines in three intersecting sets of hyperbolic equiphase position lines which pass through the location of the receiver. Considering the red slave which normally radiates at a frequency $8f$, the signals of this frequency may be compared with those of the master station of frequency $6f$ by making a phase comparison at a frequency of $24f$, the received red slave signals being multiplied in frequency in this case by a factor of three and the master signals by a factor of four to produce the comparison frequency signals $24f$. The spacing of the stations is such that, at a comparison frequency of $24f$, there would be many complete cycles of phase change if a receiver is traversed across the pattern of hyperbolic position lines between the red slave station and the master station. A phase angle determination at the receiver between the $24f$ comparison signals determines only the particular equi-phase position line in a lane, that is to say the region between two equi-phase lines corresponding to a complete cycle of phase change but does not in itself define the particular lane in which the receiver is located. This ambiguity is normally resolved by a counter counting the number of complete cycles of phase change but if the receiver should for example, enter the coverage region of the radio navigation system without its exact position being known, the counter cannot be correctly set. It is desirable therefore to have some means for identifying the particular lane. This can be done by making use of an equi-phase pattern of lines based on a very much lower effective comparison frequency, so giving a much coarser pattern of lines. It is convenient to do this by radiating signals from the transmitting stations such as would define a pattern of lines at the fundamental frequency. This might be done for example by transmitting two signals from the master station differing in frequency by the fundamental frequency (e.g. signals of $6f$ and $5f$) and by radiating two signals of further frequencies from a slave station also differing in frequency by the fundamental frequency (e.g. signals of $8f$ and $9f$) so that, at the receiver, by combining the two signals from the master station a first signal of the fundamental frequency can be obtained which can be compared in phase with a signal of the same frequency derived by combining the two signals received from the slave station.

As is explained, however in the specification of U.S. Patent No. 2,844,816 the phase of a $1f$ signal from one station may most effectively be transmitted by the use of three or more frequencies which are all harmonics of this fundamental frequency. This is because, by using three or more frequencies, the errors due to different transmission conditions, caused for example by sky-wave transmission can be substantially reduced. It is therefore the practice in many of the transmitting chains of the Decca Navigator system to provide lane identification transmission by interrupting the normal transmissions for short periods in the following sequence: During the first interruption period, the four frequencies $5f$, $6f$, $8f$ and $9f$ are all radiated simultaneously from the master station in fixed phase relation, these radiated signals being phase locked to the normal $6f$ transmisison from that station. This first interruption period, like all the other interruption periods, is only for a fraction of a second and then there is a period of several seconds of normal transmission before the next interruption period in which the four frequencies are radiated simultaneously in fixed phase relationship from the red slave station, these signals being phase locked to the normal $8f$ transmissions from the red slave. After a further period of normal transmissions for several seconds, all four frequencies are radiated simultaneously from the green slave for a short period in fixed phase relationship and phase locked to the normal transmissions and then there is yet a further period of normal transmission for several seconds before all four frequencies are radiated simultaneously from the purple slave, the four signals being in fixed phase relationship and phase locked to the normal transmissions. These short duration transmissions provide the $1f$ signals for the lane identification purposes and therefore they are conveniently referred to as lane identification transmission. The lane identification transmissions from the various stations can be identified by coding the timing sequence and in a simple convenient form of coding, there is a longer period of normal transmissions before the lane identification transmission from the master station then between the remaining lane identification transmissions. The lane identification transmissions from the master station are thus immediately identified as those occurring first after a longer period of normal transmission and the remaining ones can be identified then from the sequence in which they are radiated.

To make use of these short duration transmissions for lane identification purposes, it is necessary to store the phase of the master signals until the radiation of the various lane identification signals from the three slave stations so that each of the latter may be compared in turn with the stored master signals. To store the phase of radio frequency oscillations to an accuracy of a degree or fraction of a degree of phase over a period of many seconds, which might typically be as much as 20 seconds, it would be necessary to employ a crystal oscillator in a thermostatically controlled oven and this is not generally practical for receivers carried on aircraft and ships. In U.S. Patent No. 2,844,816 there is described an arrangement in which the receiver has, for each of the transmitting stations, an oscillator which oscillates at the same frequency as the transmission from the appropriate station and which is locked in phase with the signals received from that station during the normal transmissions. This oscillator thus serves to carry the phase of the received normal transmissions through the short duration interruptions as these may be made so short that an oscillator can readily preserve the phase to the necessary degree of accuracy without having to be arranged in a thermostatically controlled oven. The outputs of the various oscillators are passed to dividers which divide the oscillator frequencies down to the fundamental frequency of the system. During the lane identification transmissions from each of the stations, the multi-frequency signals are received and, as described in U.S. Patent No. 2,844,816 signals of all the frequencies are combined to produce a fundamental frequency signal which is used, during each lane identification transmission, to notch the divider dividing the output of the oscillator which is associated with that particular station. It will be appreciated that if a divider has to divide for example a $6f$ signal down to a frequency $1f$, the output for the divider might be locked onto any one of 6 cycles of the input $6f$ signal and thus there are six alternative phase relationships between the $1f$ output for the divider and the $6f$ input. This ambiguity however can be resolved by locking the divider with the $1f$ signal derived during the appropriate lane identification transmission. By this arrangement each of the oscillators provide a $1f$ signal which is phase locked to the received normal transmissions from the appropriate station and which is appropriately locked in phase during the lane identification transmissions from that station. The oscillator ensures that the phase is maintained throughout a complete cycle of lane identification transmissions despite the interruptions in the normal transmissions. The $1f$ signals then serve once in each lane identification cycle, to ensure that the divider notching is still correct. In the arrangement of U.S. Patent No. 2,844,816 the fundamental frequency signal derived in this way from the master frequency oscillator in the receiver is compared in phase with the fundamental frequency signals derived from each of the other oscillators to give phase angle indications with respect to fundamental frequency patterns and hence provides the necessary lane identification at this lower frequency. The lane identification however is effected basically by comparison of the phase of single frequency transmissions from each station although the ambiguities in such transmissions are resolved by the multi-frequency transmissions. In that arrangement, therefore although the combined multi-frequency signal gives $1f$ output which has smaller errors if sky-wave effects are present, this improved phase accuracy is utilized only in notching the dividers and not for the actual phase measurement for lane identification purposes.

The present invention is directed to making still fuller use of the transmissions in such a system and in particular to enabling the effective $1f$ frequency transmissions derived from the multi-frequency main identification transmissions to be employed for lane identification purposes.

According to this invention, in a receiver for a phase comparison navigation system of the kind in which signals of three or more different but harmonically related frequencies are radiated in fixed phase relationship simultaneously from one station and subsequently from another station such that the simultaneous radiations from each station in combination give a pulse output signal at a frequency lower than that of any of the radiated signals, at the receiver there are provided means for receiving all the radiated frequencies, adding means for additively combining the received signals, an oscillator phase locked to a received signal or signals from one station to provide an output of said lower frequency locked in phase to one or more of the received signals, phase measuring means for determining the phase relationship between the output of said oscillator and the output of said adding means, and means for applying a reference signal having components of all said frequencies to said receiving means in place of the received radiated signals. By this arrangement the output indication is effectively of a phase comparison between the multi-frequency signals each in turn being compared with the reference standard. Preferably adjustable phase shifting means are provided for adjusting the relative phase of at least all but one of the various received signals fed to the adding means and an indicator is provided for indicating the peak amplitude of the output of said adding means. This receiver is used in the following way: The reference signal is fed into the receiving means and said phase shifting means, which are conveniently in the inputs to said adding means from said receiving means, are then adjusted to give a peak amplitude output on the amplitude indicator. This references the receiving channels so that phase shifts are such that all the signals if received in phase, are in phase at the adding means. The receiving means are then switched to receive the radiated signals from the transmitting station and during the multi-frequency transmission from said one station (which would normally be the master station in a multi-station system), the phase measuring means will indicate any phase difference between the oscillator output and the phase of the multi-signal transmission. This gives a phase angle correction which can conveniently be effected, for example by mechanical movement of the scale on the phase measuring means, so that the phase measuring means indicates zero during these transmissions. Then during the transmissions from another station, the phase measuring means will directly indicate the phase relationship between the multi-signal transmissions from that station and the signal from the oscillator corrected in accordance with the previous measurement of the phase error between the oscillator output and the multi-signal transmissions from the first station.

In a system such as has been previously described, in which the multi-frequency transmissions occur for short periods during which normal transmissions of one frequency from each station are interrupted, most conveniently the oscillator is phase-locked to the normal transmission from one station. Its output may be fed to a divider which is notched in accordance with multi-frequency transmission from that station to avoid any ambiguity in the divider output which is used as the comparison signal for comparing with the output of said adding means. However if the phase angle indicator has an adjustable zero setting, such adjustment made during the time of the multi-frequency transmission from the station transmitting the signals to which the oscillator is locked will avoid any necessity for notching the divider as well as introducing the required compensation for correcting any phase error between the oscillator output and the multi-frequency transmission from the station transmitting the signals to which the oscillator is locked.

In a four station system using frequencies $5f$, $6f$, $8f$ and $9f$ as described above, the reference signal generator will be arranged to generate all these four frequencies. Typically the means for applying a reference signal to the receiver is an impulse generator fed from one of the received signals so as to produce a short duration impulse at the fundamental frequency. Such an impulse contains a series of harmonics of the repetition frequency in fixed phase relationship. In one embodiment of the invention, for such a four station system using four frequencies, the phase shifting means are provided in the receiving channels for the red, green and purple slave signals and these are adjusted when the reference signal is fed in through receiving means to give peak amplitude output on the indicator. The oscillator is a $6f$ oscillator with a divider dividing down to a frequency $1f$, the oscillator being phase locked with the normal transmissions from the master station. When the receiver has been referenced in this manner, it is switched back to receive the radiated signals and, during the master lane identification transmissions, the phase measuring means is set to zero. For this purpose provision may be made for freezing the output fed to the phase angle indicator during these transmissions. It is the usual practice to use discriminators producing direct voltages representative of the sine and cosine of the phase angle and these are fed to orthogonal coils of a stator assembly having a rotor driving the phase angle meter and conveniently these sine and cosine voltages may be frozen by applying them to condensers to hold them for a period longer than the lane identification transmissions. Other ways of holding a phase angle indication are however well known. Most conveniently the meter has a rotatable scale which is set so that the indication is zero on the scale during the master lane identification transmissions. Then, during the subsequent transmissions from each of the three slave stations, fundamental frequency signals derived from the multi-frequency transmissions are fed to the phase discriminator and compared with the fundamental frequency output from the divider to give the required lane identification reading with respect to the red, green and purple patterns during the three respective lane identification transmissions.

Preferably means are provided for equalizing the amplitudes of the outputs from the various receiving channels before they are fed to said adding means and for this purpose separate gain controls or attenuators may be provided in the various channels. If desired however, automatic gain control means may be provided for this purpose. The gain controls or attenuators may be separately adjusted feeding a single received signal to the peak amplitude indicator so that the various individual signals give equal amplitude indications on this indicator.

The following is a description of one embodiment of the invention, reference being made to the accompanying drawings in which:

FIGURE 1 is a diagram illustrating a typical arrangement of transmitting stations for a hyperbolic phase comparison navigation system;

FIGURE 2 is a diagram illustrating the periods of transmissions of the different frequencies from the various stations; and FIGURE 3 is a block diagram illustrating a receiver for use with the transmitting system of FIGURES 1 and 2.

Referring to FIGURE 1, there are illustrated four transmitting stations M, R, G and P which are known as the master station and the red, green and purple slave stations respectively. The positioning of these stations will depend on many factors, and in particular on the frequencies employed and the operational requirements of the navigation system. Normally these stations each radiate one signal, the various signals being of different frequencies, all harmonics of a common fundamental frequency $f$ and, it is the usual practice for the master station to radiate at frequency $6f$ and the red, green and purple stations to radiate at $8f$, $9f$ and $5f$ respectively. All the transmitted signals are locked in phase to one another. The fundamental frequency $f$ usually employed in Decca Navigator chains at the present time is about 14 kc./s.

These normal transmissions are utilized in a receiver on a mobile craft in the manner illustrated in the left hand part of FIGURE 3, the radiated signals being received by an aerial 10 and, after passing through a switch 11 to be described later, are fed to amplifiers 12, 13, 14 and 15 tuned to frequencies $6f$, $5f$, $9f$ and $8f$ respectively. The tuned amplifiers separate the different frequency signals. The output of the $8f$ amplifier 15 is multiplied in frequency by a factor of three in a frequency multiplier 16 to provide a signal of $24f$ which is compared in phase, by a phase discriminator 17, with a signal of frequency $24f$ obtained by multiplying the output from amplifier 12 by a factor of four in a frequency multiplier 18. The output from the discriminator 17 is displayed as a phase angle indication on an indicator 19 known as the "red" indicator since it indicates the phase relationship of the signals from the red slave with respect to the master station. This indicated phase relationship defines, as is well known, a hyperbolic position line which is one line in a set of confocal hyperbolae having the master and red slave stations as foci. These two stations are normally spaced so far apart that, at the effective comparison frequency of $24f$, there would be many complete cycles of phase change in traversing from the master to the slave station. It is therefore the practice to provide counters for indicating the number of complete cycles of phase change as well as a phase angle indicator.

The signals from the green slave G and the master station M are compared in the receiver by multiplying the $9f$ signals from the green slave by a factor of two in a frequency multiplier 20 and comparing the resultant $18f$ signals in a phase discriminator 21 with $18f$ signals obtained by multiplying the $6f$ signals from the master station by a factor of three in a frequency multiplier 22. The phase angle information from the discriminator 21 is displayed on a "green" indicator 23 which, like the indicator 19, displays the phase angle and a counted total of cycles of phase change. This indicator thus indicates a position line in a set of confocal hyperbolae with the master and green stations as foci.

Similarly the signals from the purple slave P and the master station M are compared in the receiver by multiplying the $5f$ signals from the amplifier 13 by a factor of six in a frequency multiplier 24 to produce signals of frequency $30f$ which are compared in phase in a discriminator 25 with signals of frequency $30f$ obtained by multiplying the $6f$ signals from amplifier 12 by a factor of five in a frequency multiplier. The phase angle information from the phase discriminator 25 is displayed on the "purple" indicator 27 which displays the phase angle and a counted total of cycles of phase change. The indicator 27 thus indicates a position line in a set of confocal hyperbolae with the master and purple slave as foci.

The form of transmitting and receiving apparatus as thus far described is well known under the name "Decca Navigator" system and it is believed unnecessary to describe this part of the apparatus any further. It provides position fixes to a very high degree of accuracy and the counter type indicators resolve the ambiguities due to the large number of cycles of phase change in traversing the hyperbolic patterns of position lines. In certain circumstances, however, for example, when first entering into the operational area of a chain of transmitting stations, it may be required to set up the counter type indicators. The phase angle indicators will automatically give correct information within the cycles of phase change but to determine the number of complete cycles of phase change to set on the counters, coarse positional information is required. Since the position within a cycle is known, it is necessary merely to identify a "lane" between two hyperbolic lines corresponding to a complete cycle of phase change and this further information is therefore known as "lane identification." There are many ways of providing lane identification and the present invention is more particularly concerned with making more effective use of certain transmissions which are provided in a number of Decca Navigator chains for lane identification purposes. As is explained in the aforementioned U.S. Patent No. 2,844,816 if signals of three or more different but harmonically related frequencies, e.g. $5f$, $6f$, $8f$ and $9f$ are radiated from one station, it is possible to obtain an effective $1f$ signal at the receiver in which phase errors due to propagation conditions are less than would be the case for example if frequencies of $8f$ and $9f$ were radiated from one station and mixed together in the receiver to produce a beat note of frequency $1f$. For this reason, the normal single frequencies transmissions are periodically interrupted and signals of frequencies $5f$, $6f$, $8f$ and $9f$ are radiated simultaneously from one station. These signals are all locked in phase with one another. FIGURE 2 shows the cyclic sequence of these transmissions. In FIGURE 2 the time scale extends from left to right and the hatched lines against the symbols M, R, G and P indicate the periods of transmission from the master, red, green and purple stations respectively. Single line hatching indicates radiation of a single frequency, that is to say 6*f* for the master station, 8*f* for the red slave, 9*f* for the green slave and 5*f* for the purple slave. The crossed hatching indicates radiation of all four frequencies from one station. The multi-frequency transmissions from the various stations start with the master station and follow at intervals of 2½ seconds, from the red, green and lastly the purple slaves. Each of these transmissions lasts for only a fraction of a second. At the end of the cycle illustrated, there is a longer interval before the cycle recommences and thus it is possible to identify the various multi-frequency transmissions since that from the master is the first after the long interval and the red, green and purple follow in sequence. There are very short breaks between the normal transmissions and the multi-frequency transmissions for signalling purposes to be described later, these breaks being short compared with the duration of each multi-frequency transmission.

The multi-frequency transmissions are of such short duration that they do not affect the normal operation of the indicators 19, 23 and 27 of FIGURE 3. One manner of utilizing these transmissions is described in the aforementioned U.S. Patent No. 2,844,816. The present invention is concerned with making more effective use of these transmissions for lane identification purposes.

Referring to the embodiment of the invention illustrated in FIGURE 3, the 6*f* signals from the amplifier 12 are fed via a normally closed contact of a change-over switch 30 to a 6*f* amplifier 31 which feeds one input of a phase discriminator 32. The other input to this discriminator is obtained from a crystal oscillator 33 via an amplifier 34. The oscillator is tuned to the frequency 6*f*. The phase discriminator 32 provides outputs, on leads 35, 36 respectively, representative of the sine and cosine of the phase angle between the two inputs to the discriminator. The sine signal, on lead 35, is applied via a normally closed contact of switch 37 to control a controllable reactance 38 which in turn controls the frequency of the oscillator 33. The signal on lead 35 is zero when the outputs of the amplifiers, 31 and 34 are in phase and this control ensures that the oscillator output is held in phase with the received 6*f* signals from the amplifier 31 and hence with the signals from amplifier 12. The oscillator 33 however provides a continuous 6*f* output including the periods of the multi-frequency transmissions, during which periods, as will be explained later, the switch 30 disconnects the amplifier 31 from the amplifier 12 and the switch 37 opens the control loop.

The 6*f* output from the oscillator 33 is fed through a further amplifier 40 to a divider 41 which divides the frequency by a factor of six to give a 1*f* output. This 1*f* signal is fed via an amplifier 42 to one input of a further phase discriminator 43 where it is compared with a 1*f* signal from an amplifier 44. The input to the amplifier 44 is derived from the received signals in the following way: The outputs from the four tuned amplifiers 12, 13, 14 and 15 at frequencies 6*f*, 5*f*, 9*f* and 8*f* respectively are combined in a pulse former 45, with the manual phase controls 46, 47 and 48 being provided for the 8*f*, 9*f* and 5*f* inputs to the pulse former 45. These phase controls are conveniently each of the goniometer type in which the input signal is applied as phase quadrature components to orthogonal stator coils and a rotor coil can be turned to give an output having a phase shift, with respect to the input, corresponding to the angular position of the rotor. The manual phase controls are adjusted, in a manner to be described later, to bring the four inputs to the pulse former 45 into the required phase relationship so that when the four received radio frequency signals are in phase, as when they are all transmitted simultaneously from one station, they will combine to give output pulses at the frequency 1*f*. The pulse former 45 shapes this 1*f* output to give short duration pulses and feeds them to a multiplier 49 which multiplies by a factor of six to give a 6*f* signal on the normally open contact of switch 30. The pulses from the pulse former 45 are also fed to a 1*f* selector 50 which provides a sinusoidal signal at frequency 1*f* for feeding to the amplifier 44.

It is required to make use of the output from the pulse former 45 only during those periods when the multi-frequency signals are radiated and, for this purpose, there has to be a switching system controlled in synchronism with the cyclic operation of the transmitters. There are many methods known for controlling switching in a receiver for this purpose; for example very short duration control pulses might be radiated from one of the stations by using a frequency very slightly different from the normal frequency from that station so that the pulses can be detected at a receiver by a suitably tuned circuit or, alternatively, for a very short period of time, the phase of the normal radiation from one station might be reversed and the phase shift detected. However, in the arrangement illustrated in FIGURE 3, the control of the switching in the receiver is effected by detecting the very short duration breaks in the 6*f* signals. This is done in the arrangement of FIGURE 3 by making use of the cosine output from the discriminator 32. During the normal transmissions, the control on the oscillator 33 keeps the sine output from the discriminator 35 at zero and hence the cosine output is at its maximum. Any interruption of the received 6*f* signals at amplifier 31 will cause the cosine output to fall and this is detected by a break detector 55 which operates a switch control relay 56. As indicated by the dashed line 57, the switch control relay 56 controls the aforementioned switches 30 and 37 so that, during all breaks in the normal transmissions, the switch 37 is open to disconnect the control for the oscillator 33 and the switch 30 changes over to give a 6*f* input to the amplifier 31 from the multiplier 49. During the multi-frequency transmissions from the various stations, the switch control relay 56 also closes five further contacts 58 to 62.

The 1*f* output from the pulse former 45 is fed via an amplifier 65 to the switch contact 58 and, when that contact is closed, it is applied to a pulse peak level indicator 66. This peak level indicator, in the particular embodiment illustrated, comprises a store 67, e.g. a capacitor charged by a peaking amplifier and a valve voltmeter 68 with an indicator 69 for indicating the voltage in the store which is arranged to hold this voltage for the period between successive peaks of the signal at the 1*f* frequency. For a reason to be discussed later, the store 67 in fact holds signals for a longer period. The pulse level indicator is used for adjusting the aforementioned phase controls 46, 47 and 48. This is done by feeding a reference signal into the tuned amplifiers 12 to 15 in place of the received radio signals. The reference signal is obtained from a reference signal generator 70 and consists of short duration pulses at a repetition rate of 1*f*. Such pulses contain a series of harmonics of the frequency 1*f* in a fixed phase relationship. To ensure that the frequency 1*f* from the reference signal generator is exactly the same as the fundamental frequency of the radiated signals, this frequency is preferably derived from one of the received signals, e.g. the master 6*f* signal and the aforementioned switch 11 serves to connect the aerial 10 to the input to the reference signal generator 70, while connecting the output from the reference signal generator 70 to the amplifiers 12 to 15 in place of the aerial. The switch 11 is manually operated and is used not only for initial adjustment of the phase controls 46, 47 and 48 but also for checking the indicators 19, 23 and 27 which should all show zero phase angle when the reference signal is applied to the amplifiers 12 to 15. For adjusting the phase controls 46, 47 and 48, the switch 11 is set to bring the reference signal generator 70 into operation and the switch 58 is also manually closed. The three phase controls 46, 47 and 48 are then adjusted, one after the other, until a peak reading is obtained on the indicator 66. In this particular embodiment, the amplifiers 12, 13, 14 and 15 have automatic gain controls which are adjusted so that the amplitudes of the outputs of all four amplifiers are equal for equal input signals. If it is desired however to adjust the various gains manually to achieve this equality, gain adjusting means, e.g. amplifiers or attenuators, may be provided in the separate inputs to the pulse former 45 and switch means provided so that one signal at a time can be applied to the indicator 66 so that the gain adjusting means may be adjusted for each of the signals separately to give the same reading on the indicator 66. The phase controls 46 to 48 need normally only be adjusted when the equipment is being made ready for operation. The switch 58 is provided so that the pulses for the multi-frequency transmissions are applied to the pulse level indicator 66. If there are no relative phase shifts between the received signals of different frequency, the indicator 66 should show the same peak level reading as when it was initially set up using the reference signal generator. If there are any relative phase shifts, the indicated level will fall and this provides an indication of propagation conditions. The store 67 is arranged to hold signals for the period from one multi-frequency transmission to the next.

The phase discriminator 43, comparing the 1f signals from the amplifiers 42 and 44, provides sine and cosine direct voltage outputs which are fed via the switches 59 and 60 to stores 72 and 73, e.g. condensers which store these signals for the period from one multi-frequency transmission to the next. The phase angle represented by the stored information is indicated on a phase angle indicator 74 which has orthogonal stator coils fed by amplifiers 75, 76 with currents proportional to the stored voltages and has a rotor, e.g. a permanent magnet, which carries a pointer 77 and which takes up an angular position corresponding to the angle represented by the sine and cosine outputs of the discriminator 43. The indicator 74 has a rotatable scale 78 which is turned, as will be described later to adjust the zero setting of the indicator.

The sine and cosine outputs of the discriminator 32 comparing the 6f signals are applied via switches 61 and 62 to stores 80, 81 which hold the information for the period between successive phase angle indicating devices. The phase angle is indicated by an indicator 82 having stator coils fed by amplifiers 83, 84 with currents proportional to the voltages in the stores 80, 81 and a rotor carrying a pointer 85.

For clarity in understanding the operation, the two indicators 74 and 82 have been shown as separate indicators in FIGURE 3. It is convenient however to combine these two indicators to have the pointers coaxially mounted and moving over a single scale 78. The 1f indicator 74 provides, during each multi-frequency transmission from the red, green and purple slaves, an unambiguous position line indication from the appropriate pattern by comparing the 1f pulses from the pulse former 45 with 1f signals from the divider 41 which divides down the output from the oscillator 33 locked to the master transmissions. The stores 72 and 73 hold the indication after the end of each multi-frequency transmission until the next such transmission. The indicator 82 gives, during each multi-frequency transmission from the red, green and purple slaves, position line information by comparing 6f signals. The higher comparison frequency gives a greater sensitivity but introduces the possibility of a sixfold ambiguity in that a phase angle measured at the 6f frequency may correspond to any one of six different positions within a cycle at 1f. The 1f comparison is used therefore only to resolve the ambiguity in the 6f indication and, for this reason, the 6f pointer 85 is driven through a six to one reduction gear and is a six-armed pointer within the six arms equally spaced. The pointer 77 is a sector indicator indicating a sector of 60° and thus selecting the particular arm of the pointer 85 which has to be used in reading on the scale.

It will be seen that this particular indicating system using two indicators 74 and 85 at frequencies 1f and 6f provides the unambiguous 1f indication with the greater sensitivity of the 6f comparison. In the simplest form of the present invention, only the indicator 74 might be employed.

The apparatus of FIGURE 3 is used in the following manner. When it is brought into operation, the phase controls 46, 47 and 48 are adjusted in the manner previously described to give a peak output on the indicator 66 and the switch 11 is then set so that the received radio signals from the aerial 10 are fed to the amplifiers 12 to 15. The indicators 19, 23 and 27 give the accurate position indicators in the known manner. During the multi-frequency transmissions, the switch control relay 56 operates the various switches so that the indicators 74 and 82, during each multi-frequency transmission, indicate the phase relationship between the 1f signals from the pulse former 45 and the output from the oscillator 33. The phase angle indicators are set in cyclic sequence to the various phase angles, holding each until the next is to be indicated. The multi-frequency signals from the master station are readily identified as the first of a cyclic sequence after a longer interval and, when these are received, the scale 78 is turned to bring the phase angle indication to zero. This means that the phase angle datum is now related to the phase of the 1f signals from the pulse former 45 during the master multi-frequency transmission, thereby making use of this transmission to correct for any phase difference between the 6f master signals to which the oscillator 33 is locked and the 1f pulses for the master. During the subsequent multi-frequency transmissions from the red, green and purple slaves, the 1f pulses from the pulse former 45 are compared with the oscillator output but the scale datum corrects for any difference between the oscillator output and the 1f pulses from the master so that effectively the 1f pulses from each slave are compared with the 1f pulses from the master. It will be understood that any changes due to varying propagation conditions will be quite slow and the fact that the scale adjustment of the indicator 74 is made a few seconds before the transmissions from the slave stations is immaterial in practice.

It will have been noted that the divider 41 is not notched in this particular embodiment. The 1f output of the divider could therefore have six different possible phase conditions since one cycle of the 1f signal may be locked to any one of six cycles of the 6f output oscillator 33. This however does not matter since the rotation of the scale 78 will correct for any ambiguity in the 1f signal in comparison with the 1f signal from the pulse former 45 during the master multi-frequency transmissions. If the divider 41 is locked in a different phase condition, then the scale 78 will be rotated to the corresponding position to give the correct zero reading. A divider, once it is in operation, will normally remain in the notched condition in which it is set in operation and re-setting of the scale 78 is normally necessitated only by changes in propagation conditions causing changes in the phase error corrections which are to be introduced to compensate for differences in the phase of the oscillator output and the 1f signals from the master station multi-frequency transmissions. It would be readily possible, however, to notch the divider 41 from the 1f signals from the pulse former 45 during the master multi-frequency transmission by providing appropriate switch means to inject these particular signals into the divider.

Once the scale 78 has been set, the user merely checks that the phase angle indication is still zero when the master multi-frequency signals are received and then reads the red, green and purple indications in sequence whenever required. This data would normally be required. This data would normally be required only for re-setting the counters on indicators 19, 23 and 27 and possibly for occasionally checking the setting of the counters. The indicator 66 provides an indication of the extent to which propagation conditions are introducing different phase shifts for different frequency signals and thus, in very bad conditions, gives some indication of the reliability of the information on the phase angle indicators.

Errors due to sky-wave signals usually vary quite slowly and the oscillator 33 merely has to maintain a comparison standard during the cyclic sequence of transmissions. Any phase error due to sky-wave signals on the frequency to which the oscillator is locked is immaterial provided it does not change during the period of a cycle of transmissions. It will be seen that in this arrangement the fundamental frequency signal derived from the multi-frequency transmissions from each of the slave stations is compared with the oscillator output and the phase angle is corrected in accordance with the measured phase error between the oscillator output and the multi-frequency transmissions from the station to which the oscillator is synchronized. It is found that in practice this gives a substantial improvement in the stability of the lane identification pattern at long ranges where it is possible that the signal may be received wholly or partly as sky-waves compared with the system described in the U.S. Patent No. 2,844,816.

I claim:

1. A receiver for a phase comparison navigation system of the kind in which signals of three or more different but harmonically related frequencies are radiated in fixed phase relationship simultaneously from one station and subsequently from another station such that the simultaneous radiations from each station in combination give a pulse output signal at a frequency lower than that of any of the radiated signals, wherein there are provided, at the receiver, means for receiving all the radiated frequencies, adding means for additively combining the received signals, an oscillator phase locked to at least one received signal from one station to provide an output of said lower frequency locked in phase to a received signal, phase measuring means for determining the phase relationship between the output of said oscillator and the output of said adding means, and means for applying a reference signal having components of all said frequencies in fixed phase relation to said receiving means in place of the received radiated signals.

2. A receiver as claimed in claim 1 wherein means are provided for synchronizing the oscillator using the multi-frequency transmissions from the station radiating the signals to which the oscillator is phase locked.

3. A receiver as claimed in claim 1 wherein said phase measuring means comprise phase angle indicating means with adjusting means so that the indicated phase angle can be set to zero during the multi-frequency transmissions from the station radiating the signals to which the oscillator is phase locked.

4. A receiver as claimed in claim 3 wherein said phase angle indicating means comprises a rotor carrying a pointer movable over a scale, the scale being rotatable to adjust the zero setting.

5. A receiver for a phase comparison navigation system of the kind in which signals of three or more different but harmonically related frequencies are radiated in fixed phase relationship simultaneously from one station and subsequently from another station such that the simultaneous radiations from each station in combination give a pulse output signal at a frequency lower than that of any of the radiated signals, wherein there are provided, at the receiver, means for receiving all the radiated frequencies, adding means for additively combining the received signals, adjustable phase shifting means for adjusting the relative phases of at least all but one of the various received signals fed to the adding means, an oscillator phase locked to at least one received signal from one station to provide an output of said lower frequency locked in phase to a received signal, phase measuring means for determining the phase relationship between the output of said oscillator and the output of said adding means, and means for applying a reference signal having components of all said frequencies in fixed phase relation to said receiving means in place of the received radiated signals.

6. A receiver for a phase comparison navigation system of the kind in which signals of three or more different but harmonically related frequencies are radiated in fixed phase relationship simultaneously from one station and subsequently from another station such that the simultaneous radiations from each station in combination give a pulse output signal at a frequency lower than that of any of the radiated signals, wherein there are provided, at the receiver, means for receiving all the radiated frequencies, adding means for additively combining the received signals, adjustable phase shifting means for adjusting the relative phases of at least all but one of the various received signals fed to the adding means, an indicator for indicating the peak amplitude of the output of said adding means, an oscillator phase locked to at least one received signal from one station to provide an output of said lower frequency locked in phase to a received signal, phase measuring means for determining the phase relationship between the output of said oscillator and the output of said adding means, and means for applying a reference signal having components of all said frequencies in fixed phase relation to said receiving means in place of the received radiated signals.

7. A receiver as claimed in claim 6 wherein the means for applying a reference signal to the receiver is an impulse generator fed from one of the received signals so as to produce a short duration impulse at the fundamental frequency.

8. A receiver as claimed in claim 6 wherein means are provided for equalizing the amplitudes of the received signals of different frequency before they are fed to said adding means.

9. In a radio navigation system in which each station normally radiates on a single frequency, all the stations using different frequencies and wherein the normal transmissions are periodically interrupted for radiation of all the frequencies from one station, the various stations each radiating all the frequencies in a sequence of interruptions of the normal transmissions; a receiver comprising means for receiving all the radiated frequencies, adding means for additively combining the received signals, an indicator for indicating the peak amplitude of the output of said adding means, an oscillator phase locked to the normal transmission from one station to provide an output of a fundamental frequency of the output of said adding means, phase measuring means for determining the phase relationship between the output of said oscillator and the output of said adding means, and means for applying a reference signal having components of all said frequencies in fixed phase relation to said receiving means in place of the received radiated signals.

10. A receiver as claimed in claim 9 wherein means are provided for storing the phase angle information determined by said phase angle measuring means until the next multi-frequency transmission.

11. A receiver as claimed in claim 9 wherein the oscillator is a crystal oscillator.

12. A radio navigation system comprising a transmitting system having at least three spaced transmitting stations arranged normally to radiate signals of one frequency from each station, the various stations radiating signals of different but harmonically related frequencies with all the signals in fixed phase relationship, the normal transmissions being interrupted periodically for radiation of all the frequencies from one station in fixed phase relationship and the various stations each radiating all the frequencies in a sequence of interruptions of the normal transmissions such that the simultaneous radiations from each station in combination give a pulse output signal at a frequency lower than that of any of the radiated signals, in combination with a receiver comprising means for receiving all the radiated frequencies, adding means for additively combining the received signals, an indicator for indicating the peak amplitude of the output of said adding means, an oscillator phase locked to at least one received signal from one station to provide an output of said lower frequency locked in phase to a received signal, phase measuring means for determining the phase relationship between the output of said oscillator and the output of said adding means, and means for applying a reference signal having components of all said frequencies in fixed phase relation to said receiving means in place of the received radiated signals.

References Cited by the Examiner

UNITED STATES PATENTS

| | | | |
|---|---|---|---|
| 3,189,903 | 6/1965 | White | 343—105 |
| 3,202,993 | 8/1965 | O'Brien | 343—105 |
| 3,209,356 | 9/1965 | Smith | 343—105 |

CHESTER L. JUSTUS, *Primary Examiner.*

H. C. WAMSLEY, *Assistant Examiner.*